US012626024B2

(12) United States Patent
Franklin et al.

(10) Patent No.: US 12,626,024 B2
(45) Date of Patent: May 12, 2026

(54) SMART CACHING FOR THREAT INTELLIGENCE

(71) Applicant: International Business Machines Corporation, Armonk, NY (US)

(72) Inventors: Douglas North Franklin, Cumming, GA (US); Cheng-Ta Lee, Cumming, GA (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 18/663,225

(22) Filed: May 14, 2024

(65) Prior Publication Data

US 2025/0356061 A1     Nov. 20, 2025

(51) Int. Cl.
G06F 21/78 (2013.01)

(52) U.S. Cl.
CPC .................................... G06F 21/78 (2013.01)

(58) Field of Classification Search
CPC . H04L 63/1433; H04L 63/20; H04L 63/0263; H04L 63/0245; G06F 21/78
See application file for complete search history.

(56) References Cited

U.S. PATENT DOCUMENTS 9,942,250 B2     4/2018   Stiansen et al.
11,513,910 B2 *  11/2022  Natanzon ............ G06F 11/1448

| | | |
|---|---|---|
| 11,552,970 B2 | 1/2023 | Moore et al. |
| 2017/0353483 A1 * | 12/2017 | Weith ...................... G06F 16/23 |
| 2018/0159881 A1 * | 6/2018 | Crabtree ............. H04L 63/1425 |
| 2020/0021609 A1 * | 1/2020 | Kuppanna ........... H04L 63/1458 |
| 2021/0092134 A1 * | 3/2021 | Ludwig ............... H04L 63/1416 |
| 2023/0147714 A1 | 5/2023 | Shaik et al. |
| 2024/0283811 A1 * | 8/2024 | Thompson .......... H04L 63/1433 |
| 2025/0273075 A1 * | 8/2025 | Munoz Hernandez ...................... G06Q 10/06311 |

OTHER PUBLICATIONS

Sun, Nan, et al. "Cyber threat intelligence mining for proactive cybersecurity defense: A survey and new perspectives." IEEE Communications Surveys & Tutorials 25.3 (2023): 1748-1774.*

(Continued)

*Primary Examiner* — Lizbeth Torres-Diaz
(74) *Attorney, Agent, or Firm* — CANTOR COLBURN LLP; Anthony M. Pallone

(57)     ABSTRACT

Mechanisms are provided for caching threat intelligence enhancements in a threat intelligence cache of a threat intelligence computing system. The mechanisms, in response to a threat intelligence enhancement (TIE) being generated based on threat intelligence data, apply one or more threat intelligence cache policies to the TIE to determine a default cache retention period for a TIE type corresponding to the TIE. Different TIE types have different default cache retention periods. The mechanisms process the TIE and corresponding context data in the threat intelligence data to determine an adjustment to the default cache retention period based on the context data. The mechanisms modify the default cache retention period by the determined adjustment to generate a modified cache retention period. The mechanisms store the TIE in a TIE cache in accordance with the modified cache retention period.

20 Claims, 4 Drawing Sheets

(56) References Cited

OTHER PUBLICATIONS

W. U. Hassan et al., This is why we can't cache nice things: Lightningfast threat hunting using suspicion-based hierarchical storage in Proc.Annu. Comput. Security Appl. Conf. (ACSAC), 2020, pp. 165-178.*

"Operationalizing Threat Intelligence", Intel Corporation, Intel Security, Solution Brief, 2020, 8 pages.

Abdolkhani, Nadia et al., "Optimal Caching Policy for D2D Assisted Cellular Networks with Different Cache Size Devices", IEEE Access, vol. 4, 2016, 10 pages.

Anonymous, "Intelligent Maintenance Scheduler Based on Contextual Analysis", IP.com Prior Art Database Technical Disclosure, IP.com No. IPCOM000266230D, Jun. 24, 2021, 11 pages.

Anonymous, "Method and System for Identity and Relationship Enhanced Threat Intelligence Service", IP.com Prior Art Database Technical Disclosure, IP.com No. IPCOM000227997D, Jun. 3, 2013, 9 pages.

Anonymous, "System and method to optimize multicloud resources and policy preparations", IP.com Prior Art Database Technical Disclosure, IP.com No. IPCOM000263144D, Aug. 2, 2020, 6 pages.

Anonymous, "Using an Automatically Generated Cache of Database Queries for Recommendation", IP.com Prior Art Database Technical Disclosure, IP.com No. IPCOM000261233D, Feb. 12, 2020, 3 pages.

Mueller, Sabrina et al., "Context-Aware Proactive Content Caching with Service Differentiation in Wireless Networks", arXiv:1606.04236v2 [cs.NI], Dec. 16, 2016, 32 pages.

Wu, Hao et al., "Energy and Delay Optimization for Cache-Enabled Dense Small Cell Networks", IEEE Transactions on Vehicular Technology, Apr. 2020, 16 pages.

* cited by examiner

SMART CACHING FOR THREAT INTELLIGENCE

BACKGROUND

The present application relates generally to an improved data processing apparatus and method and more specifically to an improved computing tool and improved computing tool operations/functionality for smart caching for threat intelligence.

Threat intelligence plays a critical role in threat management by enriching observables and contextualizing artifacts. Threat intelligence enrichment is the process of gaining context through security threat data in order to better understand the threat, where the context refers to the surrounding circumstances and data that provides insights into whether a potential threat, e.g., particular transaction, is an actual threat or not. For example, if a security tool of a computing system detects port scans against servers of a protected computer system infrastructure, threat intelligence enrichment processes may collect information regarding the potential threat, such as information about the source of the scans, e.g., where the source is located and what operating systems are running at the source, what resources are affected, and the like.

The more data that can be collected about the potential threat, the more likely the potential threat can be properly classified as to whether it is an actual threat or not and appropriate responses and decisions can be made to address it. The observables are the context data, also sometimes referred to as forensic data, observed as part of collecting data for threat intelligence enrichment are referred to as "artifacts" any may include various types of information including Internet Protocol (IP) addresses, processes, registry entries used, created, or modified, Uniform Resource Locators (URLs), files accessed, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer-implemented method is provided for caching threat intelligence enhancements in a threat intelligence cache of a threat intelligence computing system. The method comprises, in response to a threat intelligence enhancement (TIE) being generated based on threat intelligence data, applying one or more threat intelligence cache policies to the TIE to determine a default cache retention period for a TIE type corresponding to the TIE. Different TIE types have different default cache retention periods. The method further comprises processing, by a cache retention period engine, the TIE and corresponding context data in the threat intelligence data to determine an adjustment to the default cache retention period based on the context data. In addition, the method comprises modifying the default cache retention period by the determined adjustment to generate a modified cache retention period. Furthermore, the method comprises storing the TIE in a TIE cache in accordance with the modified cache retention period.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
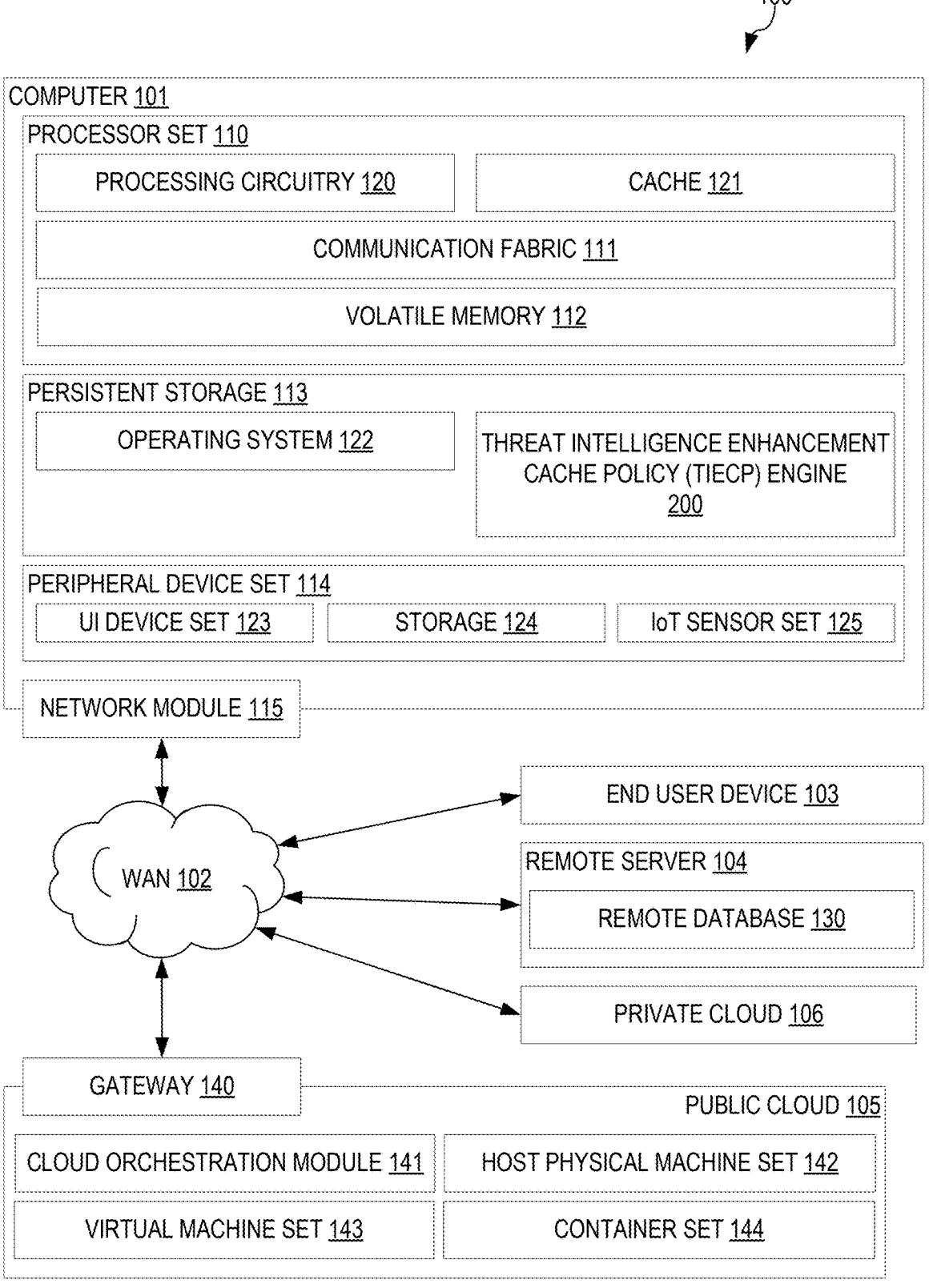
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for smart caching for threat intelligence, where threat intelligence refers to the automated and semi-automated computing tools that operate to detect and classify cyber threats against a protected computing infrastructure. Threat intelligence (TI) enables organizations to make faster, more informed, data-backed security decisions to react to and be proactive in protecting sensitive data and computing resources from cyber threats.

Threat intelligence computing tools gather security threat data about a potential threat and generate enrichments, which are analysis results that provide further information about the potential threat that can aid computing tools and human beings in making decisions and taking actions to protection the sensitive data and resources of a protected computing infrastructure. Increasingly, such threat intelligence enrichment operations are implemented as cloud computing services by threat intelligence providers, such that client computing systems can provide security threat data to the cloud computing services of the threat intelligence provider and have enrichment operations performed with the resulting enrichments being provided back to the client computing system.

The enrichment process performance is usually limited by threat intelligence providers. For example, a RestFUL Application Programming Interface (API) for enriching Internet Protocol (IP) addresses is limited by network latency and rate limiting. Most threat intelligence vendors, or providers, charge users by the number of API calls such that the more "questions" asked, i.e., the more API calls made, the larger the charges for the threat intelligence service.

As a result, caching of enrichments is an optimization that is used to not only speed up the enrichment process, but also to reduce the number of API calls and thus, the costs to clients of threat intelligence service providers. For example, Security Operations Center (SoC) analysis may enrich the same IP address multiple times in a short timeframe. The cache system can return the cached enrichment the second time it sees the same IP address. This speeds up the workflow for performing the SoC analysis as well as reduces the API calls and thus, the costs of performing the SoC analysis, i.e., the client need only pay for the first API call with subsequent requests using the cached enrichment.

While caching enrichments provides an improvement with regard to speed and costs of performing threat intelligence enrichment operations, determining the correct caching period for threat intelligence enrichments is a challenge in such caching systems. The caching period refers to the length of time that a cached enrichment is considered valid, i.e., the expiry time for the cached enrichments. In threat intelligence, caching systems can introduce false positives and false negatives if the cached enrichments expire too late. For example, the reputation of an IP address is ever-changing such that if an IP address enrichment is cached for too long of a period, a malicious IP address may turn "good" or benign (not malicious). Similarly, a benign IP address may turn "bad" or malicious in the same timeframe. There-fore, the caching period has to be set in the cache retention policies to expire the cached enrichment at the appropriate time.

However, threat intelligence cache retention policies use fixed timeframes for expiring cached enrichments. This makes the threat intelligence caching systems less adaptable and agile to the ever evolving cyber threat landscape. In other words, the fixed cache retention policy either causes too much threat intelligence enrichment data to be cached or not enough, both of which lead to false positives/negatives, as there is no room for optimization with fixed cache retention policies. Moreover, even though other, non-threat intelligence systems, may utilize a flexible caching policy based on data types, such flexible caching policies are still fixed for all instances of the same data type and are only "flexible" between data types. There is no ability in existing systems to have a flexible caching policy specifically for threat intelligence data or which is flexible on individual instances of threat intelligence data, even between instances of the same data type, based on contextual information. For example, there is no ability to implement a flexible caching policy where historical reputation of the data is used as a basis for determining the applicable caching policy for an instance of threat intelligence data.

The illustrative embodiments provide a smart caching computing tool and smart caching computing tool opera-tions/functionality that are specifically directed to this prob-lem in threat intelligence enrichment computing systems. That is, the illustrative embodiments provide a caching computing tool for caching threat intelligence enrichments with adaptable and agile cache retention policies that are based on contextual insights of the various threat intelli-gence enrichments. The caching policy applied to the vari-ous threat intelligence enrichments therefore, implement a dynamic on-the-fly cache policy determination for threat intelligence enrichments that are based on the contextual insights, such that different cache retention policies are applied to different types of threat intelligence enrichments.

With the improved smart caching computing tool and operations/functionality of the illustrative embodiments, various threat intelligence contextual insights may be evalu-ated to determine the appropriate cache retention policy to apply to a corresponding threat intelligence enhancement. For example, these threat intelligence contextual insights may include, but are not limited to, the historical reputation of observables/artifacts, the frequency of score/categoriza-tion changes, the related Indicators of Compromise (IoCs), the reputation of the TI provider, the popularity of the related threat campaign, the enrichments from other threat intelli-gence providers, and follow-up enrichments. Enrichments may be based on IoCs or may themselves be considered IoCs and thus, the terms IoCs and enrichments may be used interchangeably herein at times. However, it should be appreciated that some enrichments may involve one or more IoCs or may include additional insights generated from IoCs. Thus, the use of the term enrichment herein is intended to cover a scope of individual IoCs or additional insights generated based on one or more IoCs.

For example, with historical reputation of observables/artifacts, if an observable/artifact has a notorious history, it is less likely it will become good or benign in the near future and thus, the cache retention policy may set the expiry time to a relatively larger value. Similarly, if an observable/artifact has a clean or good reputation history, then chance that the reputation will change to a malicious or notorious classification is very low and thus, the cache retention policy may set the expiry time to be much longer as well. However, if the reputation history is fluid, or not able to be firmly classified as notorious or good, then the cache retention policy may set the expiry time to be relatively shorter as there is a higher likelihood that the reputation of the observ-able may change in the near future. For example, IP addresses may not be cached for a long period of time because they are volatile, i.e., the owner of the IP address may keep changing. However, some IP addresses are always "bad" and that reputation does not change often or at all. For these IP addresses, the IP address may be cached for much longer periods of time. To distinguish such IP addresses from other IP addresses, various IP address and domain reputation sources and tools may be utilized.

As another example, with the frequency of score/catego-rization changes type of threat intelligence context insight, Indicators of Compromise (IoCs) that a change their cat-egorization, risk score, etc., frequently, e.g., every time an enrichment is returned by a threat intelligence enrichment system, something different is observed in the response, should not be cached for as long a cache retention period than other IoCs that do not exhibit such frequent changes. It should be appreciated that in the present invention, the measure of what is "frequent" and what is not "frequent" may be a measure relative to one or more predetermined threshold values of frequency, or may be a relative measure against other threat intelligence enhancements of the same or similar type such that a determination of more or less frequent maybe made.

In a further example, for a related Indicators of Compro-mise (IoCs) threat intelligence context insight, if a new IoC is related to a list of known IoCs, the new IoC can follow the existing cache policy for the known IoC. In still another example, for popularity of the related threat campaign threat intelligence context insights, another aspect of caching is to keep the data that will be used more frequently in the cache to increase the hit rate. For IoCs that are involved in many threat campaigns, it can be assumed that those IoCs will be queried more often or more frequently than others and thus, their cache retention time periods should be relatively longer.

In another example, for enrichments from other threat intelligence providers, like a voting system, if a minority of threat intelligence providers, e.g., 1 out of 5, classify an IoC as malicious, it is much less likely to be malicious than not, or it is at least less certain that it is malicious. As a result, the IoC may be cached for a shorter period of time, or shorter retention period, because it is more uncertain. However, if a majority of the threat intelligence providers indicate the IoC to be malicious, then it may be cached for a longer period of time, or longer retention period, as there is more certainty in the determination of the malicious nature of the IoC.

Moreover, in another example, with the follow-up enrichments threat intelligence context insights, the follow-up enrichments may provide more detailed information about the potential threats and indicate whether such enrichments should be cached for longer or less periods of time. The "follow-up" enrichments may be thought of as a "round-two" enrichment. For example, when a URL is enriched, one may obtain all the IP addresses hosted by the website. A follow-up enrichment may be enriching those IP addresses to obtain their reputations. If a URL is hosted on a known bad IP address, and that IP address has been known to be bad for a predetermined period of time, then that URL may be cached for a longer period of time, or longer cache retention period, because it is unlikely it will turn "good" in the near future.

The illustrative embodiments implement a threat intelligence enhancement cache policy (TIECP) engine that collects the contextual insights and converts the collected contextual insights into features upon which one or more threat intelligence enhancement (TIE) cache policy rules may be executed or upon which one or more trained machine learning (ML) computer models, which are trained through machine learning processes to implement the one or more TIE cache policies, may be applied. Based on the execution of the one or more TIE cache policies or application of the one or more trained ML computer models, responsive actions may be executed, such as changing a cache retention period for a corresponding threat intelligence enhancement (which again may be a single IoC or an enhancement generated based on one or more IoCs), removing an entry for the threat intelligence enhancement from the cache, creating a new entry in the cache for the threat intelligence enhancement, or the like. The TIE cache policies and corresponding rules/ML computer models may leverage different features, such as time series features and statistical features, to determine what threat intelligence enhancements to cache and how long the cached entries should be retained in the cache.

In addition to creating, modifying, and removing entries in the cache, in some illustrative embodiments, the improved threat intelligence cache system also provides computing tools to proactively retrieve related observables into the cache based on contextual intelligence. For example, if a file hash is enriched, and the threat intelligence provider delivers another 200 related file hashes from the same malware family, the threat intelligence cache system of the illustrative embodiments has intelligence to proactively fetch the threat intelligence data on the additional file hashes before the client computing system requests this threat intelligence data.

In some illustrative embodiments, the improved threat intelligence cache system can also offer a feedback channel to analyze cache miss events and fine tune the one or more TIE cache policies over time. For example, if an entry has been in the threat intelligence cache but has expired, comparing the old and new cache entries may show areas where the existing TIE cache policies can be improved. If the newer cache entries have the same data as the old cache entries for a specific threat intelligence provider, for example, it may be beneficial to increase the cache retention period for threat intelligence enhancement data coming from that threat intelligence provider. Thus, based on feedback from the utilization of the threat intelligence cache, the mechanisms of the illustrative embodiments may dynamically modify cache retention policies applied to various threat intelligence enhancements, i.e., entries in the threat intelligence cache.

Thus, the illustrative embodiments provide an improved computing tool and improved computing tool operations/functionality specifically designed to address the problems with fixed cache policies with regard to caching and cached threat intelligence data. The illustrative embodiments provide a smart caching tool and operations/functionality that dynamically determines the cache retention periods for threat intelligence data, e.g., threat intelligence enhancements, based on various contextual information associated with the threat intelligence data/enhancement. Thus, different cache retention periods may be applied to different threat intelligence data/enhancements based on their contexts and these cache retention periods may be dynamically modified and updated as the contexts change over time.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a smart caching system with dynamic cache retention periods and adaptable cache retention policies for threat intelligence enrichments. The improved computing tool implements mechanism and functionality, such as the threat intelligence enhancement (TIE) cache policy engine and threat intelligence cache, which cannot be practically performed by human beings either outside of, or with the assistance of, a technical environment, such as a mental process or the like. The improved computing tool provides a practical application of the methodology at least in that the improved computing tool is able to dynamically adapt cache retention periods and policies based on the threat intelligence contexts determined for various threat intelligence enhancements on-the-fly at least by applying cache retention policy rules and/or trained machine learning computer models specifically trained to determine cache retention periods for threat intelligence enhancement cache entries based on features extracted from the threat intelligence context data gathered for a threat intelligence enhancement.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as threat intelligence enhancement cache policy (TIECP) engine 200. In addition to TIECP engine 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and TIECP engine 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in TIECP engine 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in TIECP engine 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer

101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a TIECP engine 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates smart caching of threat intelligence enhancement entries into a threat intelligence cache, where the smart caching operations/functionality dynamically determine the cache retention periods for threat intelligence enhancements based on various contextual information associated with the threat intelligence enhancement.

Figure 2:
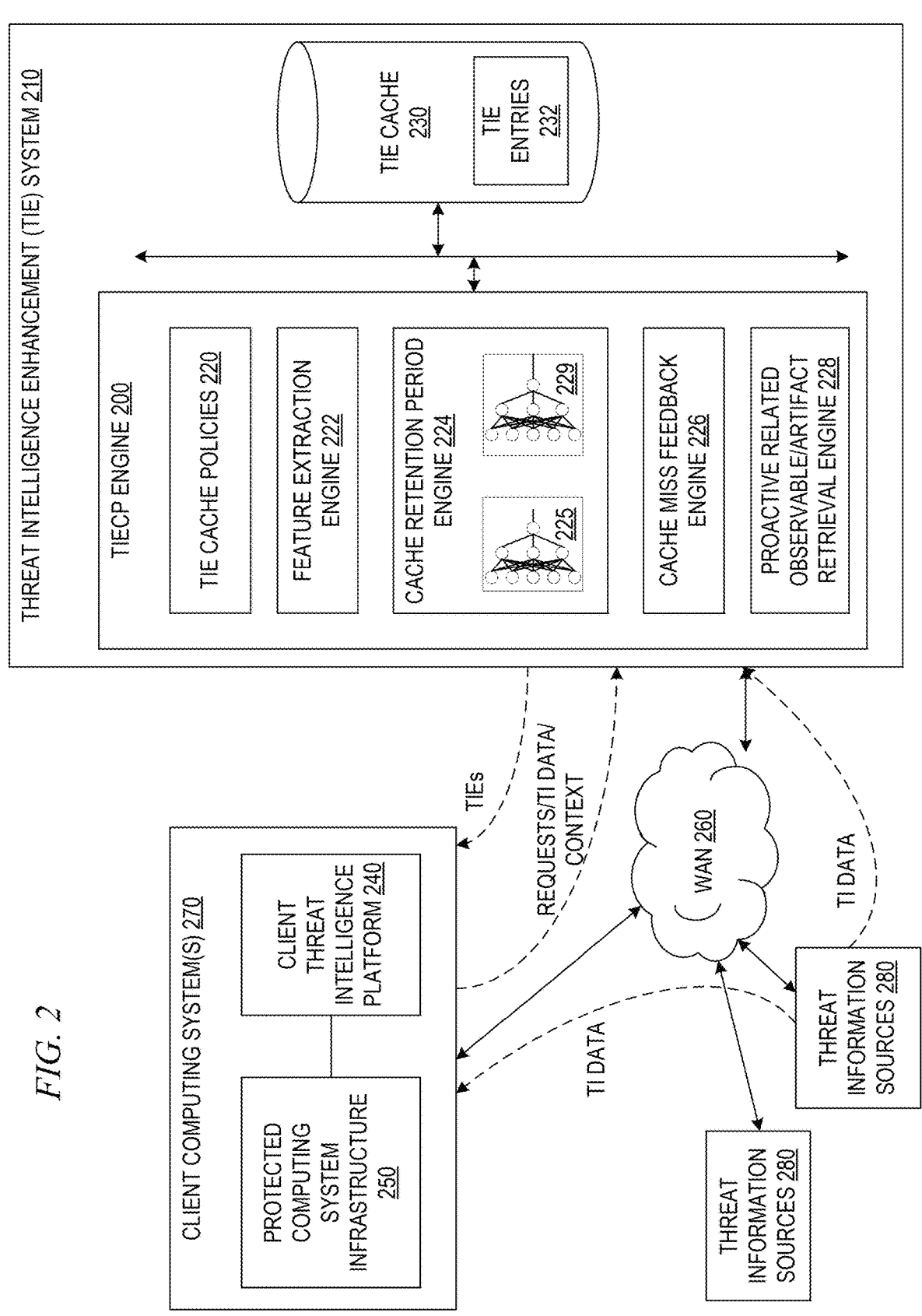
FIG. 2 is an example diagram of the primary operational components of a smart caching computing tool for threat intelligence enhancements in accordance with one illustrative embodiment.

FIG. 2 is an example block diagram illustrating the primary operational components of a threat intelligence enhancement cache policy (TIECP) engine in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., requests for threat intelligence enhancements, and the resulting output may aid human beings, such as by providing threat intelligence enhancement information that may be processed by downstream systems or viewed by human beings to assist in making informed decisions and performing responsive actions to maintain the security of the data and resources of a protected computing system infrastructure. The invention is specifically directed to the automatically operating computer components directed to improving the way that threat intelligence enhancements are cached in a threat intelligence cache system, and providing a specific smart caching tool with adaptive threat intelligence enhancement cache entry retention periods determined from a multi-factor analysis of features extracted from threat intelligence context data, which cannot be practically performed by human beings as a mental process and is not directed to organizing any human activity.

As shown in FIG. 2, the threat intelligence enhancement cache policy (TIECP) engine 200, which implements the smart caching mechanisms of the illustrative embodiments in conjunction with the threat intelligence enhancements (TIE) cache 230, may be part of a threat intelligence enhancement (TIE) system 210 provided by a threat intelligence vendor or provider, such as part of a threat intelligence enhancement cloud service or the like. While the illustrative embodiments will be described using an example of a threat intelligence enhancement cloud service, it should be appreciated that the present invention is not limited to such. To the contrary, other configurations of the TIE system 210 may also be utilized without departing from the spirit and scope of the present invention. For example, components of the TIE system 210, or a portion thereof, may be integrated into the client threat intelligence platforms 240 of one or more client computing systems 270 such that local implementations of the TIE system 210 are made possible. In some illustrative embodiments components of the TIE system 210 may be distributed among a plurality computing systems and may be split between client computing systems 270 and remotely located servers or cloud computing service provider computing systems. Any configuration of local, remote, or a combination of local and remote components of the TIE system 210 is intended to be within the spirit and scope of the present invention.

Assuming a cloud computing service based implementation for purposes of illustration, as depicted in FIG. 2, the threat intelligence enhancement system 210 operates to analyze threat intelligence data, provided by client threat intelligence platforms 240 of one or more client computing systems 270 via one or more data networks 260, to generate threat intelligence enhancements (TIEs) that are provided back to the client threat intelligence platforms 240. The threat intelligence platforms 240 provide security mechanisms that operate automatically or semi-automatically to ensure the security of data and/or computing resources of a backend protected computing system infrastructure 250. For example, the threat intelligence platforms 240 may provide firewalls, intrusion detection systems, web proxies, electronic mail gateways, security information and event management (SIEM) systems, and the like, that operate to detect potential threats, respond to the potential threats, and information appropriate personnel of the potential threats for additional responsive actions to be performed. One example of a threat intelligence platform 240 that may be utilized is IBM X-Force® and IBM Security X-Force Threat Intelligence®, available from International Business Machines (IBM)® Corporation of Armonk, New York.

Threat Intelligence platforms 240 carry out three main tasks of aggregation, analysis, and action. With regard to aggregation, threat intelligence platforms collect information from different threat intelligence feeds from various devices within the protected computing system infrastructure 250 and external sources, such as threat information sources 280, and consolidate this threat intelligence data into a centralized location. With regard to the analysis task, the threat intelligence platforms 240 identify threat indicators from the curated threat intelligence and determining their relative significance. With regard to the action task, threat intelligence platforms 240 perform automated responsive actions, and distribute relevant threat intelligence data to incident response and defense teams, so that appropriate responsive and proactive actions can be taken to protect the protected computing system infrastructure 250.

As part of the operation of the threat intelligence platforms 240, the client may engage with a vendor/provider of threat intelligence enhancement system 210 to provide threat intelligence enhancements for use by the threat intelligent platform 240 when detecting and responding to potential threats targeting the backend protected computing system infrastructure 250, e.g., during the analysis and action tasks. The client threat intelligence platform 240 may provide threat intelligence data to the threat intelligence enhancement system 210 where this threat intelligence data may comprise various types of information, such as logs, transaction history information, computer infrastructure configuration information, and the like, which may be used for performing threat intelligence enhancements and thereby generate insights into the vulnerabilities of the protected computing system infrastructure 250 and threats against this protected computing system infrastructure 250 from bad actors.

The threat intelligence enhancements themselves may take many different forms but in general are any additional information descriptive of the potential threat that is not present in the raw threat intelligence data gathered by the data collection mechanisms of the client threat intelligence platforms. That is, the threat intelligence enhancements are insights that are derived from the raw threat intelligence data through analysis, pattern matching, artificial intelligence, or other processing of the raw threat intelligence data to derive characteristics of the potential threat that are not readily identifiable from just the raw threat intelligence data. This may include one or more Indicators of Compromise (IoCs) and/or additional information and data derived from IoCs.

The threat intelligence enhancement system 210 operates on the threat intelligence data received from the client threat intelligence platform 240, which comprises various types of threat intelligence data or "observables" such as URLs, domains, hashes of files, IP addresses, and the like, and generates one or more threat intelligence enhancements (TIEs) that are provided back to the client threat intelligence platform 240. In generating TIEs, the TIE system 210 may utilize information gathered from external sources, such as threat information sources 280, which may include sources of network traffic logs, social media sites, data structures from subject matter experts, cyber counterintelligence sources (e.g., passive DNS monitoring, sinkholes, honeypots, etc.), news sites, forums, blogs, or any other source of information that may provide information regarding cyber threats which may be leveraged to generate threat intelligence enhancements based on given threat intelligence data. For example, some sources of threat intelligence data may include IBM X-Force Exchange® and IBM X-Force Threat Intelligence®, Managed Security Services (MSS), threat feed vendors, IBM Cloud Pak for Integration (CP4S)® Security-as-a-Service (SaaS) telemetry data, published Domain Generation Algorithm (DGA) characteristics, and the like.

As noted above, vendors and providers of threat intelligence enhancement systems 210 charge clients for the use of their services, and may do so based on a number of requests for TIEs received from these client threat intelligence platforms 240. In an effort to increase performance by improving the speed by which such TIEs are provided to clients, and to reduce costs for clients by reducing the number of requests that must be processed by the TIE system 210, TIEs that have been generated may be cached in the TIE cache 230 as TIE entries 232. The threat intelligence enhancement cache policy (TIECP) engine 200 manages the TIE cache 230 in accordance with TIE cache policies 220 and dynamic adaptation of these TIE cache policies 220 based on TIE types and contexts. It should be appreciated that while FIG.

2 shows the TIE cache 230 and TIECP engine 200 as part of the TIE system 210, in other illustrative embodiments, these components may be located in other systems, such as an intermediary system between the client threat intelligence platform 240 and the TIE system 210.

Thus, when generating a TIE, the TIE system 210 may cache the TIE as an entry 232 in the TIE cache 230 with a corresponding expiry time. The particular expiry time, or cache retention period, is determined by the TIECP engine 200 based on TIE cache policies 220 as a default which are then modified or adapted dynamically to the particular TIE entry 232 based on an analysis of the TIE type and context information for the particular TIE entry 232. The TIE type may be any type of threat intelligence data that can be enriched or enhanced. For example, a TIE type may be one of a plurality of predetermined TIE types including, but not limited to, for example, IP addresses, URLs, domain names, file hashes, file names, file paths, windows registries, email addresses, user-agent, MAC addresses, and the like. In the TIE cache policies 220, various cache retention periods, or expiry times, may be established as default cache retention periods/expiry times (hereafter referred to as cache retention periods) for the various TIE types, such that different TIE types may have different default cache retention periods specified in the TIE cache policies 220.

For example, some TIE types may change relatively often and thus, will have shorter cache retention periods than other TIE types that do not change as often, which will have relatively longer cache retention periods. For example, IP addresses usually have a much shorter life cycle than URLs because their reputation is ever-changing. For URLs, once a URL is identified malicious, it will usually stay malicious unless there is a false-positive. The same situation applies to file hashes, i.e., once a file hash is identified as malicious, it will stay malicious until this designation is corrected. Thus, it can be seen that, in some cases, some TIE types may reach a stable or steady state such that the TIE type is effectively never changing. For these TIE types, the cache entries may be considered "permanent" and may be utilized to provide TIEs for requests rather than processing the requests through the TIE system.

The TIECP engine 200 implements a smart caching operation and/or functionality for caching threat intelligence enrichments with adaptable and agile cache retention policies that are based on dynamically adapting the default cache retention periods for TIE types to specific cache retention periods for specific TIEs based on analysis of features in contextual information to generate contextual insights of the various threat intelligence enrichments which may then be used to determine modified TIE entry cache retention periods. Thus, the caching policy applied by the TIECP engine 200 is a combination of the default caching policy based on TIE type as specified in the cache policies 220, and the dynamic modification based on specific rules engines and/or machine learning computer model analysis of context features extracted from context information for the particular TIE. The TIECP engine 200 may the manage the retention of TIE entries in the TIE cache 230 based on the modified TIE cache policies, i.e., the dynamically determined cache retention periods. Thus, different TIE entries in the TIE cache 230 may have different cache retention periods, even for TIE entries of TIEs having a same TIE type, i.e., two different TIEs of the same TIE type may have different TIE cache retention periods based on their corresponding contexts.

In particular, the TIECP engine 200 first determines a default cache retention period for a TIE entry 232 in the TIE cache 230 based on established default cache policies 220. These default cache policies 220 comprise rules that leverage different features, such as timeseries features and statistical features, to determine what to cache and how long cache entries should be retained in the TIE cache 230. By applying the cache policies 220 to the particular TIEs generated by the TIE system 210, it can be determined whether the TIE should be cached in the TIE cache 230 and if cached, how long that TIE entry 232 should be maintained in the TIE cache 230. These policies may be initially empirically determined and then automatically or semi-automatically adjusted over time based on cache miss feedback analysis by the cache miss feedback engine 226 as discussed hereafter. The following are examples of default cache policies 220 that may be implemented:

```
{
"policies":
[
  {
    "conditions": "historical_risk_score > 10", "cache period": "1
    hour"
  },
  {
    "conditions": "risk_score_changed < 3", "cache period": "24
    hour"
  },
  {
    "conditions": "vendor_flagged_malicious > 50%", "cache
    period": "72 hour"
  },
]}
```

In the first policy, if the TIE is a historical risk score and its value is greater than 10, then the cache retention period (or "cache period") is set to 1 hour. In the second policy, if the TIE is a risk score change, and the risk score change is less than 3, then the cache period is set to 24 hours. In the third policy, if the TIE is a vendor flagged as malicious probability, and the probability is greater than 50%, then the cache period is set to 72 hours. These are only examples of cache policies and many modifications may be made without departing from the spirit and scope of the present invention. Other cache policies may involve various other types of TIEs, other conditions, and may include much more complex combinations of conditions without departing from the spirit and scope of the present invention.

The cache policies 220 provide a baseline or default cache retention period for a TIE cache entry 232 but this may be dynamically modified by the TIECP engine 200 based on the particular context of the particular TIE entry 232. In order to adjust the cache retention period for the TIE cache entry 232, a feature extraction engine 222 analyzes the context information provided by the client threat intelligence platform 240 to the TIE system 210 and/or the threat information from the threat information sources 280, to extract features representative of the context of the particular threat and thus, the context of the TIE, i.e., threat intelligence context features or insights. Examples of such threat intelligence context features or insights include, but are not limited to, the historical reputation of observables/artifacts, the frequency of score/categorization changes, the related Indicators of Compromise (IoCs), the reputation of the threat intelligence data sources or providers, e.g., threat information sources 280, the popularity of the related threat campaign, the enrichments from other threat intelligence providers, and follow-up enrichments, as discussed above.

As mentioned previously, as an example of historical reputation of observables/artifacts, if an observable/artifact has a notorious history, it is less likely it will become good or benign in the near future and thus, the cache retention policy may set the expiry time to a relatively larger value. Similarly, if an observable/artifact has a clean or good reputation history, then chance that the reputation will change to a malicious or notorious classification is very low and thus, the cache retention policy may set the expiry time to be much longer as well. However, if the reputation history is fluid, or not able to be firmly classified as notorious or good, then the cache retention policy may set the expiry time to be relatively shorter as there is a higher likelihood that the reputation of the observable may change in the near future.

The context features or insights generated by the feature extraction engine 222 are provided to the cache retention period engine 224 which determines an adjustment or modification of the default cache retention period determined from the application of the cache policies 220 to the TIE entry 232. The cache retention period engine 224 may implement one or more rules engines or trained machine learning computer models to analyze sets of these context features or insights and generate corresponding outputs specifying recommended modifications to the default cache retention periods of the TIE entries 232. As a rules engine, the rules may be similar to the cache policies 220 with regard to conditions tied to various context features or insights, and results indicating modifications to the default cache retention periods determined from the application of the cache policies 220. For example, if certain context features or insights indicate a context in which the TIE is likely not to change within the default cache retention period, then an adjustment to increase the cache retention period may be determined to be applicable and applied to adjust the cache retention period for that particular TIE entry 232 in the TIE cache 230. If certain context features or insights indicate a context in which the TIE is likely to change within the default cache retention period, then an adjustment to reduce the cache retention period may be determined to be applicable and applied to adjust the cache retention period for that particular TIE entry 232 in the TIE cache 230, or remove it entirely from the TIE cache 230 if appropriate for the particular context.

In some cases, the context features or insights may even indicate that the TIE entry 232 is not likely to ever change and thus, the TIE entry 232 may be considered a permanent TIE cache 230 entry. For example, in some cases, a context feature or insight may include a number of threat scoring sources, e.g., in threat information sources 280, indicating that a particular TIE represents a threat and thus, it is unlikely that the TIE is likely to ever indicate a non-threat. As a result, the TIE entry 232 may be set to a permanent state and may be maintained in the TIE cache 230 indefinitely.

With regard to embodiments in which the cache retention period engine 224 implements one or more trained machine learning (ML) computer models 225, 229, it should be appreciated that these ML computer models 225, 229 are trained through machine learning processes on one or more training datasets, such that the ML computer models 225, 229 learn associations and patterns of input features indicative of particular types of valid outputs. That is, the ML training process trains the one or more trained ML computer models 225, 229 to make adjustments to the cache retention periods determined by the TIE cache policies 220 based on the contextual information for the particular TIE. The ML training process uses the training data which may include instances or samples of training data comprising a TIE and contextual information for the TIE, along with a ground truth specifying the correct output expected from the ML computer model. The ML computer model 225, 229 executes on the training data of the TIE and contextual information for the TIE, and generates an output specifying an adjustment or modification to the default cache retention period. This output is compared against the ground truth to determine whether the ML computer model 225, 229 generated the correct result or output, and if not, what the error or loss is between the correct result and the output generated by the ML computer model 225, 229. This error or loss is then used along with a machine learning training algorithm, e.g., linear regression or the like, to determine a modification of operational parameters of the ML computer model 225, 229, e.g., weights assigned to nodes in a neural network based computer model. The process is then repeated for a predetermined number of iterations or epochs, or until convergence criteria are reached, e.g., an error/loss equal or less than a predetermined threshold value, at which point the ML computer model 225, 229 is considered to have converged and been trained. The resulting trained ML computer model may then be deployed for runtime use on new input data, i.e., new TIE data and context features/insights to thereby determine adjustments for cache retention times for new TIE instances.

It should be appreciated that, in some illustrative embodiments, a plurality of ML computer models may be implemented in the cache retention period engine 224 with each ML computer model 225, 229 being separately trained through ML training processes to generate recommendations as to adjustments to the default cache retention periods. In such embodiments, the ML computer models 225, 229 may be trained on the same training data or on different training data. In some cases, the ML computer models may operate on different sets of input features from the same or different training data. Thus, for example, each ML computer model 225, 229 may operate on a different combination of input threat intelligence context features or insights and generate a corresponding recommendation as to the adjustment or modification to apply to the default cache retention periods of TIE entries. The output recommendations of these ML computer models 225, 229 may be combined by combinatorial logic (not shown) or an additional trained ML computer model trained to combine the outputs from the other ML computer models 225, 229 to generate a final output recommendation for the adjustment or modification of the default cache retention period. For example, the combinatorial logic may operate on the output recommendations and combine them using a mathematical or statistical combination, e.g., a greatest adjustment being selected, an average of the recommended adjustments being generate, a mean adjustment value being selected, or the like. As another example, the combinatorial ML computer model may take each of the recommendations generated by the different ML computer models 225, 229 as input and generate the final output recommendation based on a machine learning training of the ML computer model that weights the different ML computer model outputs (which are inputs to the combinatorial ML computer model) and evaluates the combinations of these ML computer model 225, 229 outputs in accordance with its training to generate a final output recommendation that is then applied to the default cache retention period.

Based on the execution of cache retention period engine 224 and the rules engines and/or ML computer models 225, 229 implemented in the cache retention period engine 224, responsive actions may be executed, such as changing a cache retention period for a corresponding TIE entry 232, removing a TIE entry 232 from the TIE cache 230, creating a new entry 232 in the TIE cache 230 for the TIE and associating the modified or adjusted cache retention period to that new entry 232, or the like. Thus, the TIE cache policies and corresponding rules/ML computer models may leverage different features, such as time series features and statistical features, to determine what TIEs to cache and how long the cached entries 232 should be retained in the TIE cache 230.

In addition to creating, modifying, and removing entries in the cache, in some illustrative embodiments, the improved threat intelligence cache system also provides computing tools to proactively retrieve related observables into the TIE cache 230 based on contextual intelligence. That is, the proactive related observables/artifacts retrieval engine 228 operates on the observables/artifacts of the TIE to determine if there are related observables/artifacts that should be retrieved from the threat intelligence data and stored in the TIE cache 230 as related entries 232. This may involve looking at historical information for a predetermined window of time relative to a current time to determine previous results, inputs, and the like, processed by the TIE system 210.

For example, if a file hash in threat intelligence data received from the client threat intelligence platform 240 is enriched by the TIE system 210, and the threat intelligence platform 240 delivers another 200 related file hashes from the same malware family, the proactive related observables/artifacts retrieval engine 228 of the TIECP engine 200 may operate to look at this history of threat intelligence data received and processed by the TIE system 210 to identify this relationship between the current threat intelligence enhancement and the historical operation of the TIE system 210 to proactively fetch the threat intelligence data and/or enhancements generated for the additional file hashes before the client computing system 270 requests this threat intelligence data/enhancement from the TIE system 210. As another example, assume that a cache period is 72 hours for a TIE and it is determined that the client threat intelligence platform 240 finds another ten IoCs utilized by the same malware family. With the mechanisms of the illustrative embodiments, the proactive related observables/artifacts retrieval engine 228 will fetch and store those additional 10 IoCs in the TIE cache 230 as additional entries 232.

This proactive related observables/artifacts retrieval operates to increase the TIE cache 230 hit rate. For example, when performing an enrichment of an IP address, it may be found that the IP address is mentioned in a threat report, and there are another 3 URLs and 15 file hashes mentioned in that threat report. The proactive related observables/artifacts retrieval engine 228 may operate to prefetch those IoCs, i.e., the 3 URLs and 15 file hashes, and bring them back to the TIE cache 230, generating corresponding TIE cache entries 232, in order to speed up the future queries that may come from the client computing system 270, as it is assumed that it is highly likely that those related IoCs will be queried in the near future.

In some illustrative embodiments, the improved TIECP engine 200 can also offer a feedback channel to analyze cache miss events and fine tune the one or more TIE cache policies 220 over time. It should be appreciated that feedback received via the feedback channel may be the response from the threat intelligence providers. e.g., the threat intelligence enrichment results. By comparing the responses from the same IoC enrichment, the mechanisms of the illustrative embodiments can fine-tune the threat intelligence enhancement caching policy for threat intelligence enhancement types. For example, an IP address may be cached for two hours, and then after the two hours, this IP address may be enriched again. If the response from the threat intelligence enhancement system 210 is the same as the previous one, this tells the mechanisms of the illustrative embodiments that this particular TIE may be cached for a longer retention period. By collecting feedback like this, the mechanisms of the illustrate embodiments can adjust the TIE cache policy for that type of TIE over time. As an example, the result may be that the mechanisms of the illustrative embodiments operate to cache a particular IoC or TIE longer/shorter or caching the responses from a TIE provider longer/shorter.

For example, the cache miss feedback engine 226 may operate to analyze cache misses and determine whether the cache miss results in a significantly same or different subsequent TIE cache entry in the TIE cache 230 after the cache miss. That is, when a client requests a TIE from the TIE system 210, the TIE system 210 may first look to the TIE cache 230 to determine if a valid entry exists in the TIE cache 230 for the requested TIE. If so, then the TIE is provided from the TIE cache 230, i.e., there is a "cache hit". However, if there is no valid TIE cache entry in the TIE cache 230, then a "cache miss" exists and as a result, the TIE system 210 generates the TIE and stores it to the TIE cache 230. In storing the new entry 232 into the TIE cache 230, the cache miss feedback engine 226 may compare the content of the new entry 232 to previous cache entries or invalidated cache entries that have expired to determine if the new cache entry is replacing a previous, and now expired, cache entry, also referred to as the "old" entry.

The degree of correspondence is a measure of how closely the content of the new entry matches the old entry. If the measure is significantly high, i.e., equal to or greater than a predetermined threshold, it can be determined that the new entry is replacing the old entry. Moreover, measures of how often a new entry is the same as the old entry may be maintained to determine cache miss feedback that may operate to modify the cache policies 220. That is, for example, if 90% of the time a new cache entry is replacing the same old cache entry that has now expired, then the cache entries are expiring too quickly and the cache retention period can be extended in the cache policies 220. Thus, corresponding cache policies may be automatically or semi-automatically modified to increase the cache retention period specified for the corresponding cache policies 220. If the new cache entry for a TIE is the same as an old cache entry less than X % of the time, where X is a predetermined threshold value, then the cache entries are being maintained longer than they should in the TIE cache 230 and thus, the cache miss feedback may specify that the cache retention period is too long and corresponding adjustments to the cache policies 220 may be made to reduce the cache retention period for the TIE.

Thus, based on feedback from the utilization of the threat intelligence enhancement cache 230, the mechanisms of the illustrative embodiments may dynamically modify cache policies 220. These modifications may adjust the cache retention periods, or expiry times, of cache entries for corresponding TIEs in an effort to reduce cache misses occurring for TIEs that do not change frequently, and to increase cache misses for TIEs that change frequently. In this way, the likelihood that correct TIEs are provided to clients is increased by reducing potential sources of false positives/negatives.

It should be appreciated that, in some illustrative embodiments, the operations of the illustrative embodiments may be performed on a periodic basis even though a requested threat intelligence enhancement is present in a still valid TIE cache entry 232 in the TIE cache 230. Moreover, in some illustrative embodiments, the operations of the illustrative embodiments may be performed in response to a cache miss in the TIE cache, i.e., when there is no valid, unexpired, TIE cache entry 232 in the TIE cache 230 for the requested TIE. That is, the threat intelligence platform 240 sends requests for threat intelligence enhancements to the TIE system 210. The TIE system 210 first looks to the TIE cache 230 to determine if a valid, unexpired TIE cache entry 232 is present in the TIE cache 230 and if so, provides that cached TIE as a response to the request. If a valid, unexpired TIE cache entry 232 does not exist in the TIE cache 230, then the TIE system 210 may operate to generate the TIE and cache it in the TIE cache 230. In accordance with the illustrative embodiments, in some cases the operations discussed above are performed when a new TIE and corresponding TIE cache entry 232 is generated. In other illustrative embodiments, in addition to the operations when new TIE cache entries 232 are generated, certain timeout periods may be established for essentially checking the state of the TIE cache entries 232 and updating them such that even if the TIE cache 230 has valid, unexpired TIE cache entry 232, it may be updated periodically to ensure that it has not become stale.

Thus, the illustrative embodiments provide an improved computing tool and improved computing tool operations/functionality specifically designed to address the problems with fixed cache policies with regard to caching and cached threat intelligence enhancements and threat intelligence data. The illustrative embodiments provide a smart caching tool and operations/functionality that dynamically determines the cache retention periods for threat intelligence data and enhancements, e.g., threat intelligence enhancements, based on various contextual information associated with the threat intelligence data/enhancement. Thus, different cache retention periods may be applied to different threat intelligence data/enhancements based on their contexts, and these cache retention periods may be dynamically modified and updated as the contexts change over time with both adjustments to default cache retention periods and with regard to modifying the cache policies based on cache miss feedback.

Figure 3:
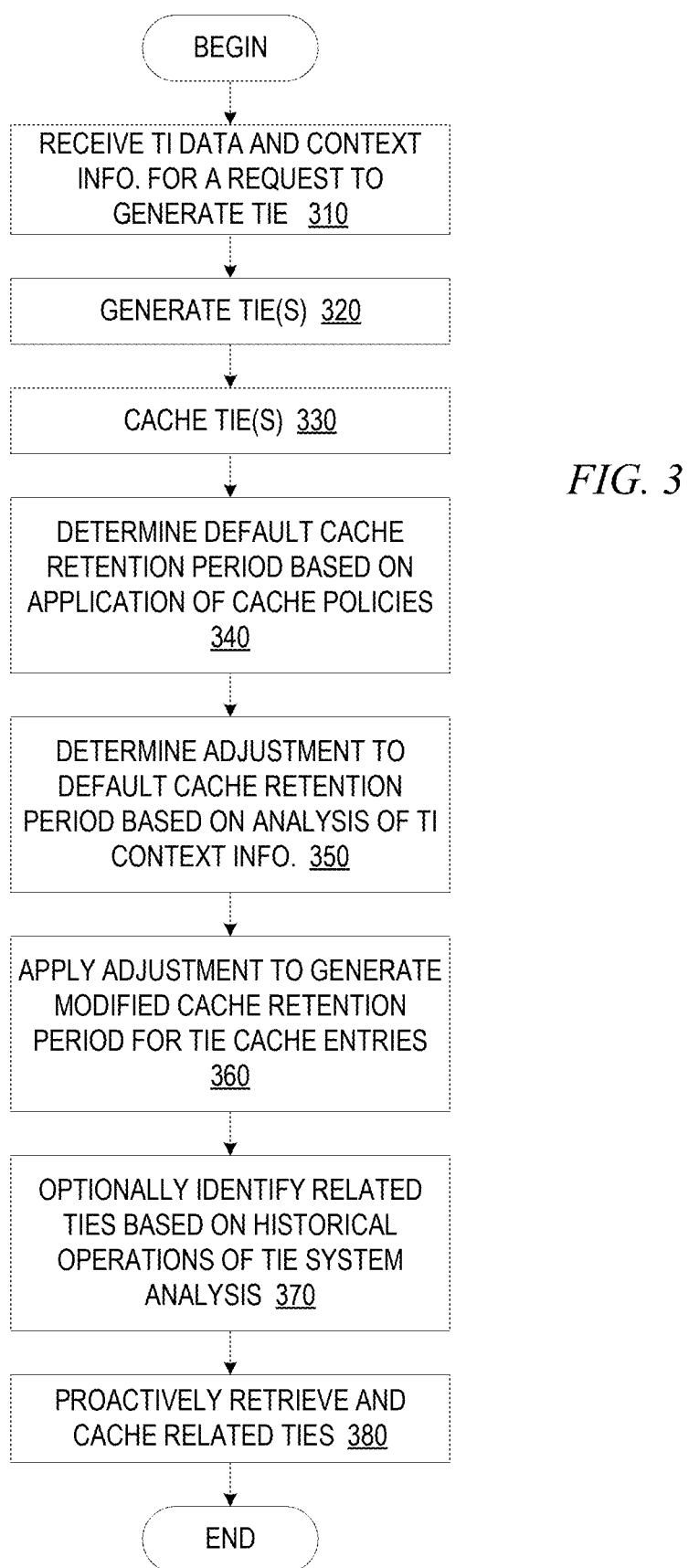
FIG. 3 is a flowchart outlining an example operation for determining a threat intelligence enhancement cache entry retention period in accordance with one illustrative embodiment.
Figure 4:
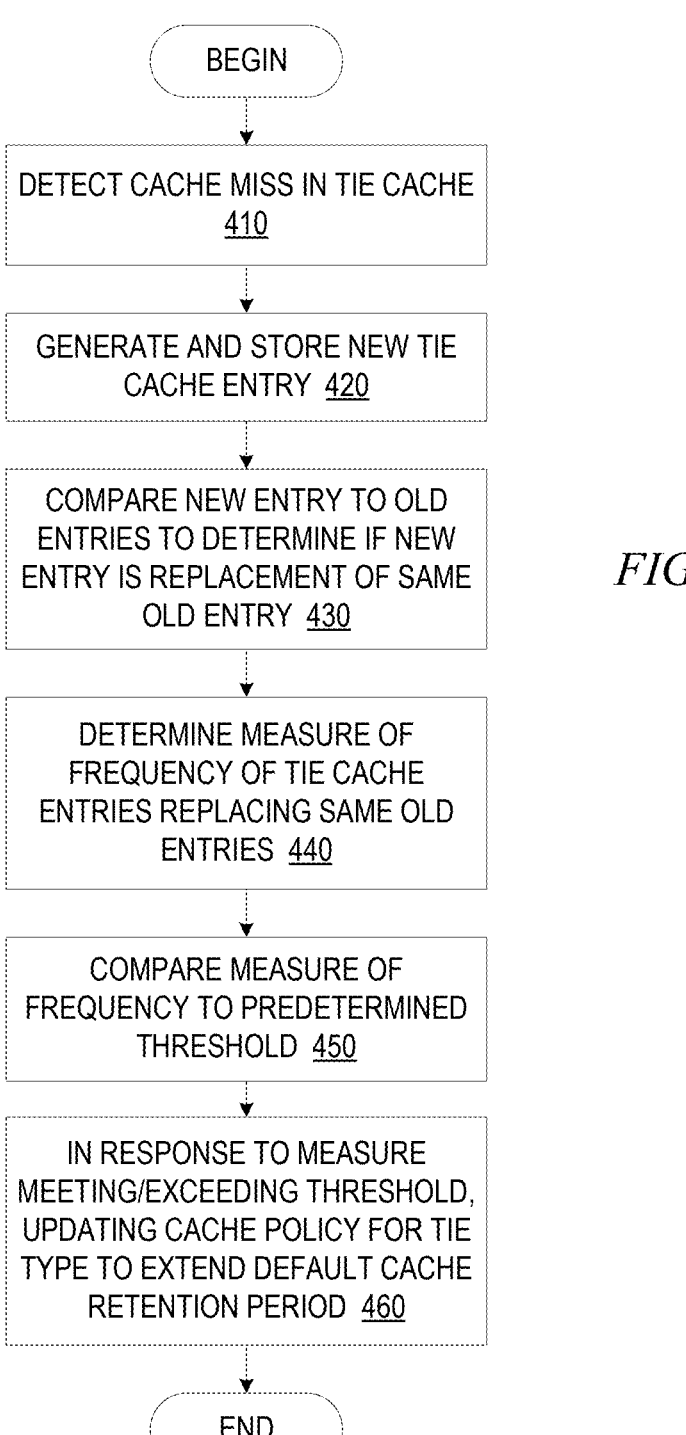
FIG. 4 is a flowchart outlining an example operation for modifying a threat intelligence caching policy for a threat intelligence enhancement in accordance with one illustrative embodiment.

FIGS. 3-4 present flowcharts outlining example operations of elements of the present invention with regard to one or more illustrative embodiments. It should be appreciated that the operations outlined in FIGS. 3-4 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 3-4, and may, in some cases, make use of the results generated as a consequence of the operations set forth in FIGS. 3-4, the operations in FIGS. 3-4 themselves are specifically performed by the improved computing tool in an automated manner.

FIG. 3 is a flowchart outlining an example operation for determining a threat intelligence enhancement cache entry retention period in accordance with one illustrative embodiment. As shown in FIG. 3, the operation starts by receiving threat intelligence data and context information for a request to generate a threat intelligence enhancement (step 310). The threat intelligence enhancement is generated (step 320) and cached as one or more entries in a threat intelligence enhancement (TIE) cache (step 330). The TIE type is determined and corresponding cache policies for the TIE type are applied to the threat intelligence data and context information to determine a default cache retention period for the TIE entry or entries in the TIE cache (step 340). An adjustment to the default cache retention period is determined based on an analysis of the threat intelligence context information (step 350). The adjustment is applied to the default cache retention period to generate a modified cache retention period for the TIE entry or entries in the TIE cache (step 360). Optionally, related TIEs may be identified based on an analysis of the historical operations and results generated by the TIE system (step 370) and these related TIEs may be fetched and proactively loaded into the TIE cache as additional cache entries (step 380). The operation then terminates.

FIG. 4 is a flowchart outlining an example operation for modifying a threat intelligence caching policy for a threat intelligence enhancement in accordance with one illustrative embodiment. As shown in FIG. 4, the operation starts by detecting a cache miss in the TIE cache (step 410). A new TIE cache entry is generated and stored to the TIE cache (step 420). The new TIE cache entry is compared to previous TIE cache entries that are invalidated or no longer live to determine if the new TIE cache entry is replacing an old cache entry (step 430). A measure of the frequency that TIE cache entries for this TIE type are replacing the same old TIE entry is updated (step 440) and compared to a predetermined threshold (step 450). In response to the measure meeting or exceeding the predetermined threshold, the cache policy for the TIE type is updated to increase the cache retention period for this TIE type (step 460). The operation then terminates. It should be appreciated that in other illustrative embodiments, similar operations may be performed to determine when to reduce the cache retention periods in cache policies based on the measures of frequently falling below a predetermined threshold over time.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for caching threat intelligence enhancements in a threat intelligence cache of a threat intelligence computing system, the method comprising:

in response to a threat intelligence enhancement (TIE) being generated based on threat intelligence data, applying one or more threat intelligence cache policies to the TIE to determine a default cache retention period for a TIE type corresponding to the TIE, wherein different TIE types have different default cache retention periods;

processing, by a cache retention period engine, the TIE and context data in the threat intelligence data to determine an adjustment to the default cache retention period based on the context data, wherein the context data corresponds to the TIE;

modifying the default cache retention period by the determined adjustment to generate a modified cache retention period; and storing the TIE in a TIE cache in accordance with the modified cache retention period.

2. The computer-implemented method of claim 1, wherein the context data comprises at least one of historical reputation of observables/artifacts, frequency of score/categorization changes, related indicators of compromise, reputation of threat intelligence provider, popularity of related threat campaign, and enrichments from other threat intelligence providers.

3. The computer-implemented method of claim 2, wherein processing the TIE and the context data comprises:

converting the context data to context features;

inputting the context features into one or more trained machine learning computer models; and processing the context data, by the one or more trained machine learning computer models, to generate one or more recommendations as to the adjustment to apply to the default cache retention period.

4. The computer-implemented method of claim 1, further comprising:

analyzing a cache miss event to provide feedback for optimization of the one or more threat intelligence cache policies; and automatically optimizing the one or more threat intelligence cache policies based on the feedback.

5. The computer-implemented method of claim 4, wherein analyzing the cache miss event comprises:

comparing a new TIE cache entry for the cache miss event to one or more previously generated TIE cache entries to determine if the new TIE cache entry is replacing a same previous TIE cache entry that has expired; and in response to the new TIE cache entry being determined to have replaced the same previous TIE cache entry, automatically extending a cache retention period in at least one of the threat intelligence cache policies.

6. The computer-implemented method of claim 4, wherein analyzing the cache miss event comprises:

comparing a new TIE cache entry for the cache miss event to one or more previously generated TIE cache entries to determine if the new TIE cache entry is replacing a same previous TIE cache entry that has expired;

calculating a measure of frequency that new TIE cache entries for a TIE type replace the same TIE cache entry in the TIE cache based on the comparison; and automatically modifying a cache retention period in at least one of the threat intelligence cache policies for the TIE type based on the calculated measure of frequency.

7. The computer-implemented method of claim 6, wherein automatically modifying the cache retention period comprises at least one of automatically extending the cache retention period in response to the measure of frequency being equal to or above a first predetermined threshold, or automatically reducing the cache retention period in response to the measure of frequency being below a second predetermined threshold.

8. The computer-implemented method of claim 1, wherein storing the TIE in a TIE cache in accordance with the modified cache retention period further comprises:

identifying one or more related TIEs referenced in the context data; and prefetching the one or more related TIEs into the TIE cache as additional TIE cache entries in response to identifying the one or more related TIEs as being referenced in the context data.

9. The computer-implemented method of claim 1, wherein the computer-implemented method is executed in response to a request from a threat intelligence platform for the threat intelligence enhancement of the threat intelligence data and the threat intelligence enhancement not being present in the threat intelligence enhancement cache.

10. The computer-implemented method of claim 1, wherein the threat intelligence data comprises threat intelligence data from a third party threat intelligence source computing system, and wherein the third party threat intelligence source computing system comprises one or more of a network traffic log source computing system, a social media computing system, a subject matter expert data source computing system, a news website computing system, a forum computing system, a blog computing system, or cyber counterintelligence source computing system.

11. A computer program product comprising a computer readable storage medium having a computer readable program stored therein, wherein the computer readable program, when executed on a computing device, causes the computing device to:

apply, in response to a threat intelligence enhancement (TIE) being generated based on threat intelligence data, one or more threat intelligence cache policies to the TIE to determine a default cache retention period for a TIE type corresponding to the TIE, wherein different TIE types have different default cache retention periods;

process, by a cache retention period engine, the TIE and context data in the threat intelligence data to determine an adjustment to the default cache retention period based on the context data, wherein the context data corresponds to the TIE;

modify the default cache retention period by the determined adjustment to generate a modified cache retention period; and store the TIE in a TIE cache in accordance with the modified cache retention period.

12. The computer program product of claim 11, wherein the context data comprises at least one of historical reputation of observables/artifacts, frequency of score/categorization changes, related indicators of compromise, reputation of threat intelligence provider, popularity of related threat campaign, and enrichments from other threat intelligence providers.

13. The computer program product of claim 12, wherein processing the TIE and the context data comprises:

converting the context data to context features;

inputting the context features into one or more trained machine learning computer models; and processing the context data, by the one or more trained machine learning computer models, to generate one or more recommendations as to the adjustment to apply to the default cache retention period.

14. The computer program product of claim 11, wherein the computer readable program further causes the computing device to:

analyze a cache miss event to provide feedback for optimization of the one or more threat intelligence cache policies; and automatically optimize the one or more threat intelligence cache policies based on the feedback.

15. The computer program product of claim 14, wherein analyzing the cache miss event comprises:

comparing a new TIE cache entry for the cache miss event to one or more previously generated TIE cache entries to determine if the new TIE cache entry is replacing a same previous TIE cache entry that has expired; and in response to the new TIE cache entry being determined to have replaced the same previous TIE cache entry, automatically extending a cache retention period in at least one of the threat intelligence cache policies.

16. The computer program product of claim 14, wherein analyzing the cache miss event comprises:

comparing a new TIE cache entry for the cache miss event to one or more previously generated TIE cache entries to determine if the new TIE cache entry is replacing a same previous TIE cache entry that has expired;

calculating a measure of frequency that new TIE cache entries for a TIE type replace the same TIE cache entry in the TIE cache based on the comparison; and automatically modifying a cache retention period in at least one of the threat intelligence cache policies for the TIE type based on the calculated measure of frequency.

17. The computer program product of claim 16, wherein automatically modifying the cache retention period comprises at least one of automatically extending the cache retention period in response to the measure of frequency being equal to or above a first predetermined threshold, or automatically reducing the cache retention period in response to the measure of frequency being below a second predetermined threshold.

18. The computer program product of claim 11, wherein storing the TIE in a TIE cache in accordance with the modified cache retention period further comprises:

identifying one or more related TIEs referenced in the context data; and prefetching the one or more related TIEs into the TIE cache as additional TIE cache entries in response to identifying the one or more related TIEs as being referenced in the context data.

19. The computer program product of claim 11, wherein the apply, process, modify, and store operations are executed in response to a request from a threat intelligence platform for the threat intelligence enhancement of the threat intelligence data and the threat intelligence enhancement not being present in the threat intelligence enhancement cache.

20. An apparatus comprising:

at least one processor; and at least one memory coupled to the at least one processor, wherein the at least one memory comprises instructions which, when executed by the at least one processor, cause the at least one processor to:

apply, in response to a threat intelligence enhancement (TIE) being generated based on threat intelligence data, one or more threat intelligence cache policies to the TIE to determine a default cache retention period for a TIE type corresponding to the TIE, wherein different TIE types have different default cache retention periods;

process, by a cache retention period engine, the TIE and context data in the threat intelligence data to determine an adjustment to the default cache retention period based on the context data, wherein the context data corresponds to the TIE;

modify the default cache retention period by the determined adjustment to generate a modified cache retention period; and store the TIE in a TIE cache in accordance with the modified cache retention period.

* * * * *